May 1, 1962 R. H. WITT 3,031,836
CURTAIN STRUCTURE FOR UTILITY HARVESTER
Filed Sept. 30, 1959
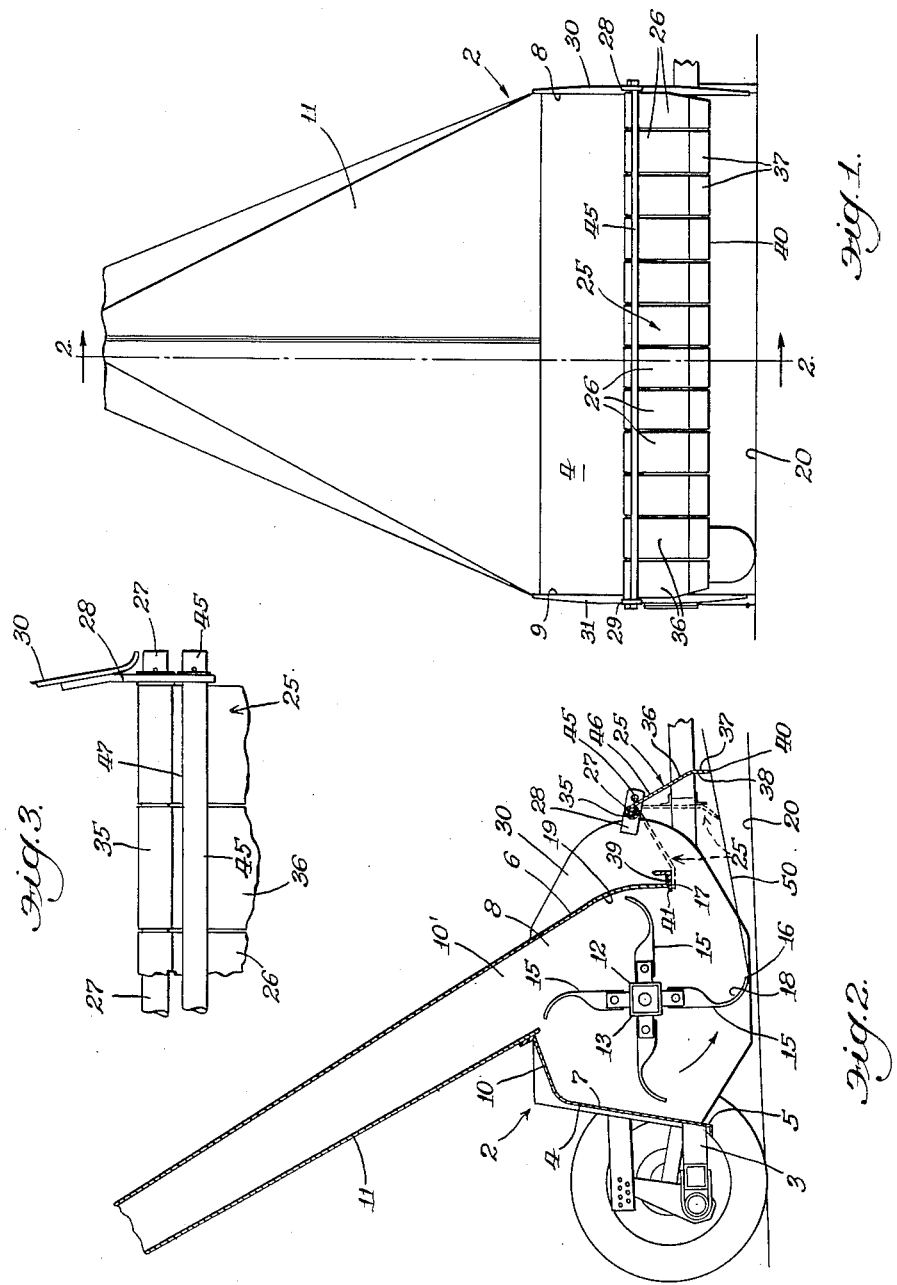
Inventor:
Robert H. Witt

United States Patent Office

3,031,836
Patented May 1, 1962

3,031,836
CURTAIN STRUCTURE FOR UTILITY HARVESTER
Robert H. Witt, Hinsdale, Ill., assignor to International Harvester Company, Chicago, Ill., a corporation of New Jersey
Filed Sept. 30, 1959, Ser. No. 843,436
5 Claims. (Cl. 56—501)

This invention relates to forage harvesters of the type generally known as utility harvesters wherein a chopper is employed to directly cut the material in the field and to convey it to an associated conveyor or by direct discharge into a trailing wagon.

A general object of the invention is to provide a novel curtain structure mounted in front of the harvester for guiding the plants into the chopper and at the same time functioning to restrict the trajectory of stones or other debris which may be picked up by the knives and thrown forwardly in the direction of a towing vehicle and which may injure the operator.

A more specific object of the invention is to provide a novel curtain structure which comprises a plurality of side by side swingably mounted plate elements and more specifically to a novel mounting thereof which is disposed a substantial distance in front of and upwardly of the forward edge of the harvester housing whereby provision is thereby made for the curtains to hand a substantial distance below the lower forward edge of the rotor housing and interference with the movement of the crops into the housing is virtually eliminated and at the same time the curtains serve to bend over preliminarily large plants and the like.

A still further object of the invention is to provide a novel curtain structure in which the independent curtain elements have a maximum swinging back against the underside of the shear bar at the forward lower edge of the forage harvester housing, the individual curtain members being of flat sheet metal and having lower ends angled rearwardly whereby in the rearwardmost position of the curtain members the lower ends seat substantially flat against the shear bar and the upper portions of the members angle upwardly and forwardly to provide a diagonal guide path for the crops into the harvester.

These and other objects and advantages inherent and encompassed by the invention will become more apparent from the specification and the drawings wherein:

FIGURE 1 is a fragmentary view of a forage harvester incorporating the invention;

FIGURE 2 is a sectional view taken substantially on the line 2—2 of FIGURE 1, and FIGURE 3 is an enlarged fragmentary plan view of a portion of the curtain structure.

Describing the invention in detail and having particular reference to the drawings there is shown a forage harvester generally designated 2 which includes a wheeled frame structure 3 supporting a housing 4, said housing having an open bottom 5, front and rear walls 6 and 7 and side walls 8 and 9. In the present instance the top wall 10 is provided with an opening 10' which communicates with a discharge chute 11 angled upwardly and rearwardly in which the crops are directed to a trailing wagon or the like.

Within the housing 4 there is supported a rotary structure 12 which includes a center shaft 13 rotatably mounted between the walls 8 and 9 and swingably carrying a plurality of knives 15—15 which are rotatable in the direction of the arrow as shown in FIGURE 2, the knives 15 having sharp leading edges 16 which shear the material against the shear bar 17 located at the lower edge of the front wall 6 of the housing and carrying the material within the pockets 18 along the interior curved surface 19 of the front wall and discharging the material from the chute 11.

It will be noted that the shear bar 17 of necessity must be elevated with respect to the ground line represented at 20 in order to admit the crops underneath the housing. Inasmuch as the clearance from the shear bar 17 to the ground is substantial, it will be readily apparent that any of the blades 15 upon striking an obstruction such as stones or other debris would pick this up and fling it forwardly in the direction of an operator who is towing the harvester.

To forestall this occurrence the invention provides a novel curtain structure generally designated 25 which comprises a series of generally flat plate members 26 which are penduously suspended from a pivot member or bar 27 extending generally parallel to the rotor shaft 13, the bar 27 being supported between a pair of forwardly projecting lugs 28 and 29 connected to the divider portions 30 and 31 which are formed as forward continuations of the walls 8 and 9 and project forwardly of the front wall 6 of the housing. The pivot or the rod 27 is located a substantial distance ahead of the shear bar 17 or the lower forward edge of the housing and above the same.

Each member 26 is bent or rolled at its upper end to provide a loop or pivot sleeve portion 35 by means of which the members 26 are sleeved in side by side relationship upon the bar or shaft 27 in order to provide a continuous wall or deflector area from one side to the other side of the harvester. It will be noted that the upper portion 36 of each member 26 extends substantially vertically in static position and that the lower portion 37 which adjoins the portion 36 is angled rearwardly, the angle being chosen in such relation to the pivot point 27 and the location of the shear bar 17 that in the swung back position of member 26 portion 37 seats with its rear side 38 substantially flat against the underside 39 do not interfere and do not get in the way of the moving forwardly of the edge 41 of the shear bar whereby in maximum rearwardly displaced position the members 26 do not interfere and do not get in the way of the moving knife blades 15 and at the same time the arrangements being such that the flow of material is unrestricted underneath the shear bar and is assisted by the diagonal disposition forwardly and upwardly of the upper portion 36 of the shield member 26 when it is in such maximum displaced position.

Forwardly of the bar or rod 27 there is provided a stop member 45 in the form of a rod mounted between the lugs 28 and 29, the stop member 45 being disposed slightly lower than the rod 27 and so arranged that upon any of the curtain members 26 swinging forwardly as they are struck by stones or the like, the said members 26 will each engage with the forward side 46 of the upper part 36 against the back edge 47 of the rod 45. It will be seen that in the forwardmost position as shown in dotted lines in FIGURE 2 the upper part 36 of each curtain member extends diagonally downwardly and forwardly in downwardly deflecting relationship to stones or other debris and that the lower part 37 extends substantially vertically whereby the stone is deflected downwardly. At the same time it will be seen that the limit of the trajectory of any stone if it should move under the curtain is extremely low as represented by the line 50 in FIGURE 2. The pivot of the flaps is located approximately on a line tangent to the rotor and the forward section of the shear bar, thus providing no material flow interference compared with the device not equipped with the safety device.

Thus a novel flexible curtain or shield structure has been provided which not only facilitates the delivery of the crops into the forage harvester but at the same time provides a novel and effective protection for the operator.

What is claimed is:

1. In a forage harvester of the type having a housing with an open bottom and a front wall terminating in a lower forward edge and a rotor mounted in the housing and operative to cut crops directly from a field and convey them into the housing, the improvement comprising a curtain structure suspended from the housing on a pivot member ahead of the front wall and above said forward edge and depending a substantial distance below said lower forward edge of the housing.

2. The invention according to claim 1 and said curtain structure comprising a plurality of individual pendent segments and each segment described in its static position comprising a substantially vertical upper portion and a diagonal rearwardly inclined lower portion.

3. The invention according to claim 1 and said curtain structure comprising a plurality of individual pendent segments and each segment described in its static position comprising a substantially vertical upper portion and a diagonal rearwardly inclined lower portion and said upper portions having a length bridging the space between said axis and said edge of the housing and the angle of lower portion being such that the lower portion extends generally horizontally when in contact with said edge.

4. The invention according to claim 1 and stop means mounted ahead of said structure for abutment thereby in the stone-deflecting position thereof.

5. The invention according to claim 1 and said curtain structure comprising flaps, and stop means operatively associated with said flaps for limiting forward movement thereof to a position disposing upper portions thereof diagonally downwardly and forwardly and simultaneously lower portions thereof substantially vertically.

References Cited in the file of this patent

UNITED STATES PATENTS

| | | |
|---|---|---|
| 2,815,631 | Northcote et al. | Dec. 10, 1957 |
| 2,836,021 | Wood et al. | May 27, 1958 |
| 2,864,223 | Lundell | Dec. 16, 1958 |